United States Patent
Wu et al.

(10) Patent No.: US 8,718,160 B2
(45) Date of Patent: May 6, 2014

(54) MULTI-CARRRIER OPTICAL COMMUNICATION METHOD AND SYSTEM BASED ON DAPSK

(75) Inventors: Jian Wu, Beijing (CN); Hui Wang, Beijing (CN); Yan Li, Beijing (CN); Xiaobin Hong, Beijing (CN); Hongxiang Guo, Beijing (CN); Yong Zuo, Beijing (CN); Kun Xu, Beijing (CN); Wei Li, Beijing (CN); Jintong Lin, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 0 days.

(21) Appl. No.: 13/450,894

(22) Filed: Apr. 19, 2012

(65) Prior Publication Data

US 2013/0070866 A1  Mar. 21, 2013

(30) Foreign Application Priority Data

Sep. 16, 2011 (CN) .......................... 2011 1 0274515
Dec. 2, 2011 (CN) .......................... 2011 1 0397065

(51) Int. Cl.
*H04K 1/10* (2006.01)
*H04L 27/28* (2006.01)

(52) U.S. Cl.
USPC ............................. 375/260; 398/158; 398/193

(58) Field of Classification Search
USPC .................................. 375/260; 398/158, 193
See application file for complete search history.

(56) References Cited

U.S. PATENT DOCUMENTS

| | | | |
|---|---|---|---|
| 2004/0151255 A1* | 8/2004 | Riazi et al. | 375/260 |
| 2007/0076820 A1* | 4/2007 | Kao et al. | 375/322 |
| 2007/0104286 A1* | 5/2007 | Deng et al. | 375/267 |
| 2010/0034542 A1* | 2/2010 | Armstrong | 398/158 |

FOREIGN PATENT DOCUMENTS

| | | |
|---|---|---|
| CN | 1604514 A | 4/2005 |
| CN | 101335556 A | 12/2008 |
| CN | 101938438 A | 1/2011 |
| CN | 102111374 A | 6/2011 |

OTHER PUBLICATIONS

The 1st Office Action of the priority application 201110397065.0, Dec. 3, 2013.

* cited by examiner

*Primary Examiner* — Chieh M Fan
*Assistant Examiner* — Tanmay Shah
(74) *Attorney, Agent, or Firm* — Kubotera & Associates, LLC

(57) ABSTRACT

The present invention provides an optical communication method, comprising: performing modulation on the obtained bit stream data to generate modulated signals; performing differential encoding on the modulated signals to generate differentially encoded signals; converting the differentially encoded signals into electrical signals; and mapping the electrical signals onto optical carriers to generate optical signals for transmission. With the present invention, it is possible to enhance the system's capability of resisting inter-carrier interference without decreasing spectrum efficiency, hence improving the tolerance of existing optical communication systems towards laser linewidth, fast-changing PMD, optical fiber nonlinearity, inter-channel interference and other damages, greatly enhancing system performances.

10 Claims, 13 Drawing Sheets

Time domain differential decoding for multi-carrier signals

Time domain differentiation for multi-carrier signals

Frequency domain differentiation for multi-carrier signals

Differential encoding procedure for single-carrier signals

Time domain differential decoding for multi-carrier signals

Frequency domain differential decoding for multi-carrier signals

Differential decoding for single-carrier signals

| b0(i,k) b1(i,k) b2(i,k) | φ(i,k) | b3(i,k) | A(i,k) |
|---|---|---|---|
| 000 | 0 | 0 | 1 |
| 001 | π/4 | | |
| 011 | π/2 | | |
| 010 | 3π/4 | | |
| 110 | π | 1 | 2 |
| 111 | 5π/4 | | |
| 101 | 3π/2 | | |
| 100 | 7π/4 | | |

701 → b0(i,k) b1(i,k) b2(i,k); 702 → φ(i,k); 703 → b3(i,k); 704 → A(i,k)

q-OFDM has only one training symbol without being added therein pilot subcarriers q-OFDM has both training symbols and pilot subcarriers q-OFDM has only one training symbol without being added therein pilot subcarriers q-OFDM has both training symbols and pilot subcarriers

MULTI-CARRRIER OPTICAL COMMUNICATION METHOD AND SYSTEM BASED ON DAPSK

TECHNICAL FIELD

The present invention relates to optical fiber communication field, more particularly to an optical communication method and a system based on differential encoding.

BACKGROUND

Multi-carrier technology has been proposed in order to enhance the spectrum efficiency of a light transmitting system. Up to date, this technology mainly uses WDM, OFDM and Superchannel proposed by Bell Laboratory in 2010.

Among them, WDM is the English abbreviation for wavelength division multiplexing, in which the carrier separation is generally on the order of tens GHz. OFDM is the English abbreviation for orthogonal frequency division multiplexing, and was introduced into the optical communication field from the wireless communication field. Up to date, OFDM may be divided into traditional OFDM, in which OFDM signals generated in electrical domain are loaded onto optical carriers and thus the sub-carrier separation is small and usually on the order of MHz, and all-optical OFDM, in which signals are generated, similar to WDM, fully in optical domain, but the sub-carrier intervals are smaller and the number of carriers is comparatively small. Superchannel is based on a plurality of phase-locked sub-carriers generated by one light source, with the purpose of greatly increasing spectrum efficiency of the system.

However, multi-carrier optical communication systems reported up to now are mainly based on Phase Shift Keying (PSK) modulation technique or Quadrature Amplitude Modulation (QAM) technique, not involving a differential encoding modulation technique, such as Differential Amplitude Phase Shift Keying (DAPSK) modulation technique. Both PSK and QAM encoded multi-carrier systems have problems with inter-carrier interference and various corresponding methods are available for compensation for a specific system.

In an optical OFDM system which is a present research hotspot, since OFDM signals obtained by using a conventional modulation technique have a higher peak-power ratio, effects caused by optical fiber nonlinearity become a tough problem. As for conventional PSK or QAM encoded OFDM signals, known data such as training symbols, pilot sub-carriers or a separately inserted radio frequency signal is used to perform channel estimation, phase noise compensation and so on, which on one hand increases data redundancy and reduces spectrum efficiency, on the other hand increases the complexity of the digital signal processing at the receiver.

SUMMARY OF THE INVENTION

In view of the above problems, the object of the present invention is to provide a differential encoding based optical communication method and system. With the present invention, it is possible to enhance the system's capability of resisting inter-carrier interference without decreasing spectrum efficiency, hence improving the tolerance of existing optical communication systems for laser linewidth, fast-changing PMD, optical fiber nonlinearity and other damages.

According to one aspect of the present invention, there is provided an optical communication method, comprising: performing modulation on the obtained bit stream data, so as to generate modulated signals; performing differential encoding on the modulated signals, so as to generate differentially encoded signals; converting the differentially encoded signals into electrical signals; and mapping the electrical signals onto optical carriers, so as to generate optical signals for transmission.

According to one embodiment of the above aspect, in case that the electrical signals are multi-carrier signals, the step of performing differential encoding on the modulated signals so as to generate the differentially encoded signals comprises: performing differential encoding on the same sub-carrier of adjacent symbols in the modulated signals if the differential encoding is performed in time domain; or, performing differential encoding on the adjacent sub-carriers of the same symbol in the modulated signals if the differential encoding is performed in frequency domain.

According to another embodiment of the above aspect, in case that the electrical signals are single-carrier signals, the step of performing differential encoding on the modulated signals so as to generate the differentially encoded signals comprises: performing differentiation on adjacent symbols in the modulated signals.

According to another embodiment of the above aspect, the bit stream data are modulated by using an amplitude phase shift keying (APSK) technique.

According to another embodiment of the above aspect, if the differential encoding is performed in time domain, the method further comprises: performing serial-to-parallel conversion on the modulated signals so as to convert the modulated signals into parallel signals before the differential encoding is performed; and performing inverse Fourier transformation, cyclic prefix addition and parallel-to-serial conversion on the differentially encoded signals so as to generate differentially encoded OFDM data signals after the differential encoding is performed.

According to another embodiment of the above aspect, if the differential encoding is performed in frequency domain, the method further comprises: performing serial-to-parallel conversion, inverse Fourier transformation, cyclic prefix addition and parallel-to-serial conversion on the differentially encoded signals so as to generate differentially encoded OFDM data signals after the differential encoding is performed.

According to another aspect of the present application, there is provided an optical communication method, comprising: at the transmitter, performing modulation on the obtained bit stream data, so as to generate modulated signals; performing differential encoding on the modulated signals, so as to generate differentially encoded signals; converting the differentially encoded signals into electrical signals; and mapping the electrical signals onto optical carriers, so as to generate optical signals and transmit the optical signals; and at the receiver, converting the received optical signals into corresponding electrical signals; performing differential decoding on the electrical signals that have been subjected to the photoelectric conversion procedure; and performing demodulation on the electrical signals that have been subjected to the differential decoding procedure, so as to obtain the bit stream data.

According to an aspect of the application, there is provided a transmitter, comprising: a modulation unit, configured to perform modulation on the obtained bit stream data so as to generate modulated signals; a differential encoding unit, configured to perform differential encoding on the modulated signals, so as to generate differentially encoded signals; a conversion unit, configured to convert the differentially encoded signals into electrical signals; a mapping unit, configured to map the electrical signals onto optical carriers, so as to generate optical signals; and a transmitting unit, configured to transmit the generated optical signals.

According to an embodiment of the above aspect, in case that the electrical signals are multi-carrier signals, the differential encoding unit performs differential encoding on the same sub-carrier of adjacent symbols in the modulated signals if the differential encoding is performed in time domain; or the differential encoding unit performs differential encoding on adjacent sub-carriers of the same symbol in the modulated signals if the differential encoding is performed in frequency domain.

According to another embodiment of the above aspect, the transmitter further comprising: a first serial-to-parallel conversion module, configured to perform serial-to-parallel conversion on the modulated signals to generate parallel signals when the electrical signals are multi-carrier signals and the differential encoding is performed in time domain; or configured to perform serial-to-parallel conversion on the differentially encoded signals to generate parallel signals when the electrical signals are multi-carrier signals and the differential encoding is performed in frequency domain; an IFFT module, configured to perform inverse Fourier transformation on the differentially encoded signals outputted from the differential encoding unit or the parallel signals outputted from the serial-to-parallel conversion module; a cyclic prefix addition module, configured to add cyclic prefixes to the signals that have been subjected to the inverse Fourier transformation; a first parallel-to-serial conversion module, configured to perform parallel-to-serial conversion on the signals that have been subjected to the cyclic prefix addition procedure to generate differentially encoded OFDM signals.

According to an embodiment of the above aspect, the mapping unit comprises: a first laser source, configured to generate optical carriers; and an optical signal generating unit, configured to modulate the differentially encoded signals onto the optical carriers, so as to be converted to optical signals.

According to another aspect of the application, there is provided a receiver, comprising: a receiving unit, configured to receive the optical signals transmitted from a transmitter; a photoelectric conversion unit, configured to convert the received optical signals into corresponding electrical signals; a differential decoding unit, configured to perform differential decoding on the electrical signals outputted from the photoelectric conversion unit; and a demodulation unit, configured to perform demodulation on the electrical signals outputted from the differential decoding unit, so as to generate bit stream data.

According to an embodiment of the above aspect of the application, the receiver further comprising: a second serial-to-parallel conversion module, configured to convert the electrical signals from serial signals to parallel signals; a cyclic prefix removal module, configured to remove the cyclic prefixes from the parallel signals; a FFT module, configured to perform Fourier transformation on the signals outputted from the cyclic prefix removal module; and a second parallel-to-serial conversion module, configured to convert the parallel signals outputted from the FFT module into serial signals for being further processed by the differential decoding unit, or configured to convert the parallel signals, obtained after the signals outputted from the FFT module are processed by the differential decoding unit, into serial signals.

According to another aspect of the application, there is provided an optical communication system, comprising: a transmitter as described above; and a receiver as described above.

With the differential encoding based optical communication method and system according to the present invention, it is possible to improve the capability of the system to resist inter-carrier interference without decreasing spectrum efficiency, and thus improve the tolerance of the optical communication system for laser linewidth, fast-varying PMD, optical fiber nonlinearity, inter-carrier interference and other damages, greatly improving the performances of the communication system, since the differential modulation on signals is conducted at the signal transmitter. Furthermore, the present invention can avoid the need for inserting known data such as training symbols and pilot sub-carriers for the compensating algorithm such as channel estimation, and meanwhile can improve the performances of the system, and greatly enhance the system's effective speed and spectrum efficiency.

To achieve the above-mentioned and related purposes, one or more aspects of the present invention include features that will be explained in detail below and particularly described in claims. The following descriptions and accompanying drawings explain in detail some illustrative aspects of the present invention. However, these aspects only illustrate some of the various fashions in which the principle of the present invention can be applied. Furthermore, the present invention is intended to cover all these aspects and their equivalents.

BRIEF DESCRIPTION OF THE DRAWINGS

Other objects and effects of the present invention will become clearer and easier to understand upon referring to contents of the description in connection with the drawings and claims and with more comprehensive understanding of the present invention, in which:

Throughout the drawings, identical reference numbers indicate similar or corresponding features or functions.

DETAILED DESCRIPTION OF PREFERRED EMBODIMENTS

Hereinbelow, embodiments of the present invention will be described with reference to the accompanying drawings. It is understood that described embodiments are only some of, not all of, the embodiments of the present invention. All other embodiments obtained by those ordinary skills in the art on the basis of the embodiments in the present invention and without any creative labor belong to the protection scope of the present invention.

In order to enhance capability to resist inter-carrier interference without decreasing spectrum efficiency, the optical communication system according to the present invention may perform encoding at the transmitter on the bit stream data to be transmitted by using a differential encoding technique and have the resultant differentially encoded electrical signals modulated onto optical carriers to generate optical signals for transmission, and may perform decoding at the receiver on the received optical signals by using a corresponding differential decoding technique, so as to obtain the transmitted bit stream data. The method according to the present invention can improve the tolerance of the optical communication system for laser linewidth, fast-varying PMD, optical fiber non-linearity and other damages and thus improve the performances of the communication system by conducting differential modulation on signals at the signal transmitter.

In the following description, APSK modulation technique is used as an example to describe the present invention, however, it should be understood that other modulation techniques such as QAM, BPSK, QPSK and so on may be used.

Figure 1:
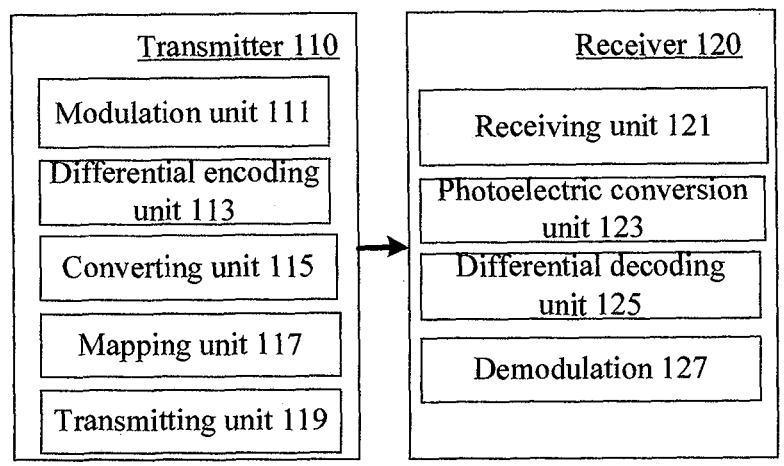
FIG. 1 is a block diagram showing the differential encoding based optical communication system according to an embodiment of the present invention.

FIG. 1 shows a block diagram of the differential APSK (DAPSK)-based optical communication system 100 according to the present invention.

As shown in FIG. 1, the optical communication system 100 comprises a transmitter 110 and a receiver 120, wherein the transmitter 110 comprises a modulation unit 111, a differential encoding unit 113, a converting unit 115, a mapping unit 117 and a transmitting unit 119; the receiver 120 comprises a receiving unit 121, a photoelectric conversion unit 122, a differential decoding unit 125 and a demodulation unit 127.

At the transmitter, the modulation unit 111 performs modulation on the obtained bit stream data to generate modulated signals. The bit stream data may be inputted from the outside, or may be generated by a data signal source inside the transmitter 110. The differential encoding unit 113 performs differential encoding on the modulated signals to generate differentially encoded signals, and send the same to the converting unit 115. The converting unit 115 converts the differentially encoded data into electrical signals. Herein, the converting unit 115 usually refers to a D/A converting unit, which converts digital signals into analog signals.

Then, the mapping unit 117 maps the electrical signals onto optical carriers to generate optical signals, and the generated optical signals are transmitted by the transmitting unit 119.

Hereinbelow, the signal processing methods according to the present invention will be described with reference to the logic structures of the system.

Differentially Encoded Electrical Signal Generating Processes

It will be described with reference to FIG. 2A-2C how to generate differentially encoded electrical signals on the basis of bit stream data.

Figure 2A:
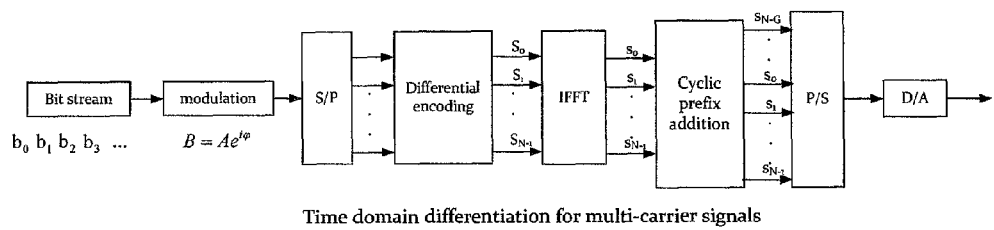
FIG. 2A-2C are schematic diagrams showing the differential encoding procedures in the transmitter in FIG. 1.
Figure 2B:
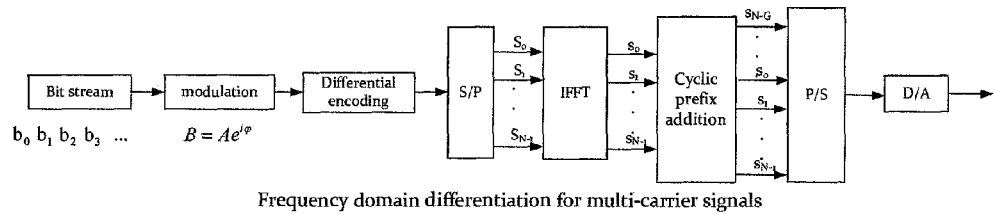

In case the electrical signals are multi-carrier signals, as shown in FIGS. 2A and 2B, in addition to the modulation unit 111, the differential encoding unit 113 and the converting unit 115, the transmitter further comprises a first serial-to-parallel converting unit, an IFFT unit, a cyclic prefix adding unit and a first parallel-to-serial converting unit.

In this case, if the differential encoding is performed in time domain, then differentiation is performed on the same sub-carriers of adjacent symbols in the modulated signals during the differential encoding process, which is also referred to as time domain differential encoding. In this case, as shown in FIG. 2A, the modulation unit 111 performs modulation on the obtained bit stream data to generate modulated signals, the first serial-to-parallel converting unit performs serial-to-parallel conversion on the modulated signals to generate parallel signals, the differential encoding unit 113 performs differential encoding on the parallel signals, the IFFT unit performs inverse Fourier transformation on the differentially encoded signals outputted from the differential encoding unit 113 to transform the signals into time domain from frequency domain. Then, the cyclic prefix adding unit adds cyclic prefixes on the signals transformed by the IFFT unit. After that, the first parallel-to-serial conversion unit converts the parallel signals outputted from the cyclic prefix adding unit into serial signals (i.e. differentially encoded OFDM signals), and outputs the same into the D/A conversion unit 115.

If the differential encoding is performed in frequency domain, then differentiation is performed on the adjacent sub-carriers of a same symbol in the modulated signals during the differential encoding process, which is also referred to as frequency domain differential encoding. In this case, as shown in FIG. 2B, the modulation unit 111 performs modulation on the obtained bit stream data to generate modulated signals, the differential encoding unit 113 performs differential encoding on the modulated signals. Then, the first serial-to-parallel converting unit performs serial-to-parallel conversion on the differentially encoded signals to generate parallel signals, the IFFT unit performs inverse Fourier transformation on the parallel signals outputted from the first serial-to-parallel conversion unit to transform the signals into time domain from frequency domain. After that, the cyclic prefix adding unit adds cyclic prefixes to the IFFT processed signals, the first parallel-to-serial conversion unit converts the parallel signals outputted from the cyclic prefix adding unit into serial signals (i.e. differentially encoded OFDM signals), and outputs the same to the D/A conversion unit 115.

Figure 2C:
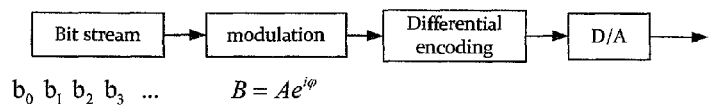

In case the obtained differentially encoded electrical signals are single-carrier signals, as shown in FIG. 2C, the modulation unit 111 performs modulation on the obtained bit stream data to generate modulated signals, then, the differential encoding unit 113 performs differential encoding on the adjacent symbols in the modulated signals to generate differentially encoded signals. Then, the D/A conversion unit converts the differentially encoded signals into electrical signals. The generated electrical signals may be transmitted through single optical carrier or multiple optical carriers.

Mapping Process

The mapping unit 117 is configured to map the electrical signals converted from the differentially encoded signals onto optical carriers to generate light signals.

In case the bit stream data is inputted from outside to the direct detection optical OFDM system (i.e. the transmitter is used in a direct detection optical OFDM system), the mapping unit 117 may comprise a first laser source and a light signal generating unit. The first laser source is configured to generate optical carriers; the light signal generating unit is configured to modulate the electrical signals, which are differentially encoded, onto optical carriers to generate light signals for transmission by the transmitting unit.

In case the bit stream data is inputted from outside to the coherent optical OFDM system (i.e. the transmitter is used in a coherent optical OFDM system), in addition to the first laser source and the light signal generating unit, the mapping unit 117 may further comprise a first 90 degree light phase shift unit, which is configured to shift the phase of the generated light signals by 90 degrees.

In the receiver 120, a receiving unit 121 is configured to receive the light signals transmitted by the transmitter. A photoelectric conversion unit 123 is configured to convert the received light signals into corresponding electrical signals. A differential decoding unit 125 is configured to perform differential decoding on the electrical signals photoelectrically converted from the light signals. A demodulation unit 127 is configured to demodulate the electrical signals, which have been processed by the differential decoding unit, to obtain the bit stream data.

Wherein, the photoelectric conversion unit 123 may be a direct detection device or a coherent detection device, depending on whether a direct detection or a coherent detection is adopted in the receiver 220.

The direction detection device may comprise a light filter and a photoelectric diode.

Wherein, the light filter is configured to extract the optical carrier carrying the required signals. The photoelectric diode is configured to convert the light signals into electrical signals.

The coherent detection device may comprise a light filter, a second laser source, a 90 degree optical hybrid and a photoelectric diode, and may further comprise a light coupler.

Wherein, the light filter is configured to extract DAPSK light signals carried by the optical carriers, the laser source is configured to generate a local optical carrier, the 90 degree optical hybrid is configured to mix the extracted DAPSK light signals with the local optical carrier, the photoelectric diode is configured to convert the mixed DAPSK light signals into DAPSK electrical signals. The laser source, the 90 degree light hybrid and the photoelectric diode are connected.

Similar to the case of the transmitter, the obtained DAPSK electrical signals may be processed in different manners depending on whether the obtained DAPSK electrical signals are single-carrier signals or multi-carrier signals.

Figure 3A:
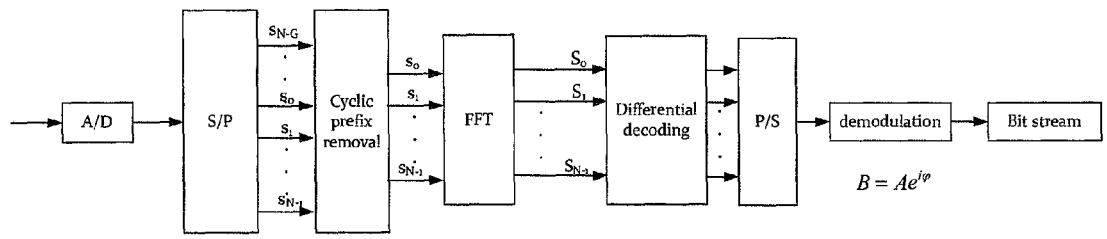
FIG. 3A-3C are schematic diagrams showing the differential decoding procedures in the receiver in FIG. 1.
Figure 3B:
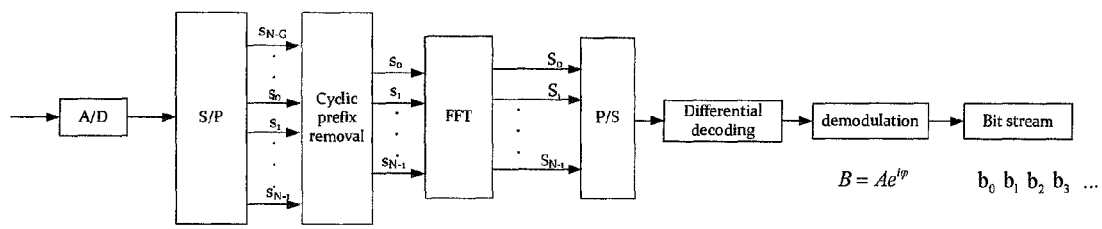

In case the obtained DAPSK electrical signals are multi-carrier signals, as shown in FIGS. 3A and 3B, the receiver may further comprise a second serial-to-parallel conversion unit, a cyclic prefix removing unit, a FFT unit and a second parallel-to-serial conversion unit.

If the differential encoding is performed in time domain, then when the DAPSK electrical signals are processed in the receiver, as shown in FIG. 3A, the second serial-to-parallel conversion unit converts the electrical signals from serial signals into parallel signals, the cyclic prefix removing unit removes the cyclic prefixes from the parallel signals, the FFT unit performs Fourier transformation on the cyclic prefix removed signals, the differential decoding unit performs differential decoding on the parallel signals outputted from the FFT unit, and then the second parallel-to-serial conversion unit converts the parallel signals outputted from the differential decoding unit into serial signals, and outputs the serial signals to the demodulation unit for demodulation.

If the differential encoding is performed in frequency domain, then when the DAPSK electrical signals are processed in the receiver, as shown in FIG. 3B, the second serial-to-parallel conversion unit converts the electrical signals from serial signals into parallel signals. The cyclic prefix removing unit removes the cyclic prefixes from the parallel signals, the FFT unit performs Fourier transformation on the cyclic prefix removed signals, the second parallel-to-serial conversion unit converts the parallel signals processed by the FFT unit into serial signals, the differential decoding unit performs differential decoding on the converted serial signals, and outputs the differentially decoded signals to the demodulation unit for demodulation.

Figure 3C:
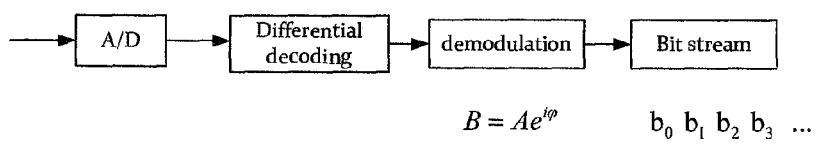

In case the obtained DAPSK electrical signals are single-carrier signals, as shown in FIG. 3C, firstly, the A/D conversion unit converts the DAPSK electrical signals from analog signals into digital signals. After that, the differential decoding unit performs differential decoding on the digitals, wherein the differential decoding performed herein corresponds to the differential encoding performed in the transmitter. Then, the differentially decoded data are outputted to the demodulation unit for demodulation, so as to obtain the bit stream data.

According to the format of DAPSK modulation of the present invention, the DAPSK signals, either generated in time domain or generated in frequency domain, do not require known data such as training symbols, pilot sub-carriers et. al. Thus, there is no consumption of compensating algorithm at the receiver such as extra channel estimation. Just because the differentiating relationship is introduced at the transmitter, the compensating algorithm, such as channel estimation, involving known data such as training symbols, pilot sub-carriers and so on is not necessary in the above-mentioned DAPSK-based multi-carrier optical communication method and system provided by the present invention, and inter-carrier interference can be effectively reduced, and tolerance towards laser linewidth, fast-varying PMD, optical fiber non-linearity, inter-channel interference and other damages can be improved.

Figure 4:
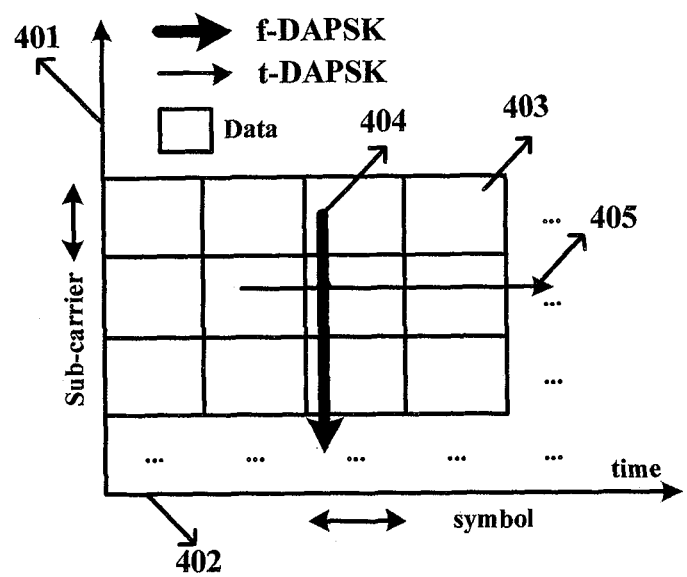
FIG. 4 is a schematic diagram showing how to generate frequency domain differential APSK (f-DAPSK) signals and time domain differential APSK (t-DAPSK) signals according to the present invention.

FIG. 4 is a structural representation of generating f-DAPSK and t-DAPSK signals in frequency domain according to an embodiment of the present invention. In this structural representation, signals are plotted in time direction and in frequency direction, wherein 401 denotes the vertical axis, i.e., the frequency axis, with the interval being one sub-carrier and 402 denotes the horizontal axis, i.e., the time axis, with the interval being one symbol. 403 denotes the data carried on one sub-carrier in one symbol. 404 denotes the direction in which f-DAPSK signals are generated by performing differentiation in frequency domain, namely the direction along the adjacent sub-carriers in the same symbol. 405 denotes the direction in which t-DAPSK signals are generated by performing differentiation in time domain, namely the direction along the adjacent symbols carried on the same sub-carrier.

Figure 5:
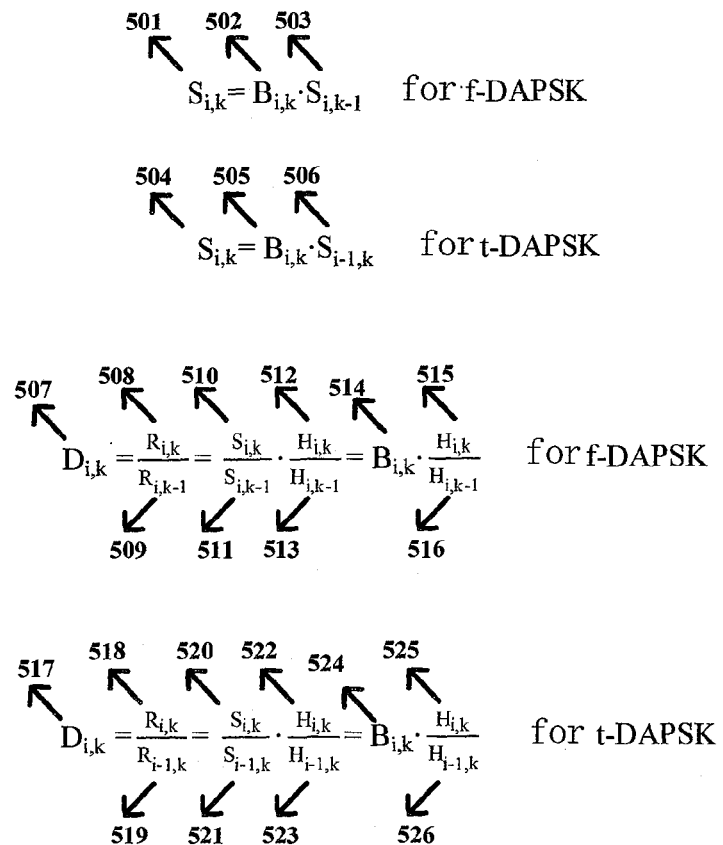
FIG. 5 is a principle schematic diagram showing the generation and demodulation procedures of f-DAPSK and t-DAPSK signals according to the present invention.

FIG. 5 is a principle schematic diagram of generating and demodulating f-DAPSK and t-DAPSK signals according to the present invention, specifically showing how to generate DAPSK signals and how to implement non-coherent demodulation. As shown in FIG. 5, 501 denotes the complex signal on the $k_{th}$ sub-carrier of the $i^{th}$ symbol after differential encoding, 502 denotes the complex signal on the $k^{th}$ sub-carrier of the $i^{th}$ symbol before differential encoding, 503 denotes the complex signal on the $k-1^{th}$ sub-carrier of the $i^{th}$ symbol after differential encoding. Therefore, as far as f-DAPSK signals are concerned, they are obtained by performing differentiation on the information of the adjacent sub-carriers of the same symbol.

504 denotes the complex signal on the $k^{th}$ sub-carrier of the $i^{th}$ symbol after differential encoding, 505 denotes the complex signal on the $k^{th}$ sub-carrier of the $i^{th}$ symbol before differential encoding, 506 denotes the complex signal on the $k^{th}$ sub-carrier of the $i-1^{th}$ symbol after differential encoding. Therefore, as far as t-DAPSK signals are concerned, they are obtained by performing differentiation on the information of the adjacent symbols carried on the same sub-carrier.

507 denotes the signal on the $k^{th}$ sub-carrier of the $i^{th}$ symbol after differential demodulation at the receiver, 508 denotes the received complex signal on the $k^{th}$ sub-carrier of the $i^{th}$ symbol, 509 denotes the received complex signal on the $k-1^{th}$ sub-carrier of the $i^{th}$ symbol, and 510 denotes the complex signal on the $k^{th}$ sub-carrier of the $i^{th}$ symbol at the transmitter. 511 denotes the complex signal on the $k-1^{th}$ sub-carrier of the $i^{th}$ symbol at the transmitter, 512 denotes the transfer function factor concerning the $k^{th}$ sub-carrier of the $i^{th}$ symbol, 513 denotes the transfer function factor concerning the $k-1^{th}$ sub-carrier of the $i^{th}$ symbol, 514 denotes the complex signal on the $k^{th}$ sub-carrier of the $i^{th}$ symbol before differential encoding at the transmitter, 515 denotes the transfer function factor concerning the $k^{th}$ sub-carrier of the $i^{th}$ symbol, 516 denotes the transfer function factor concerning the $k-1^{th}$ sub-carrier of the $i^{th}$ symbol, 517 denotes the signal on the $k^{th}$ sub-carrier of the $i^{th}$ symbol after differential demodulation, 518 denotes the received complex signal on the $k^{th}$ sub-carrier of the $i^{th}$ symbol. 519 denotes the received complex signal on the $k^{th}$ sub-carrier of the $i-1^{th}$ symbol. 520 denotes the complex signal on the $k^{th}$ sub-carrier of the $i^{th}$ symbol at the transmitter, and 521 denotes the complex signal on the $k^{th}$ sub-carrier of the $i-1^{th}$ symbol at the transmitter. 522 denotes the transfer function factor concerning the $k^{th}$ sub-carrier of the $i^{th}$ symbol. 523 denotes the transfer function factor concerning the $k^{th}$ sub-carrier of the $i-1^{th}$ symbol. 524 denotes the complex signal on the $k^{th}$ sub-carrier of the $i^{th}$ symbol before differential encoding at the transmitter. 525 denotes the transfer function factor concerning the $k^{th}$ sub-carrier of the $i^{th}$ symbol. 526 denotes the transfer function factor concerning the $k-1^{th}$ sub-carrier of the $i^{th}$ symbol.

Figure 6:
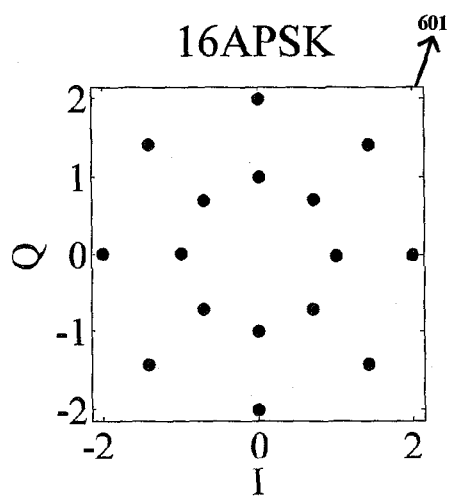
FIG. 6 is a constellation map generated according to an embodiment of the present invention with 16APSK signals as an example.

FIG. 6 is a constellation map generated according to the present invention with 16APSK signals as an example. It should be noted that, for 16APSK, a symbol contains 4 bits of information, and FIG. 6 shows only one of the 16APSK constellation maps with 8 phases and 2 amplitudes. The same is true for both f-DAPSK and t-DAPSK.

Figures 7, 8:
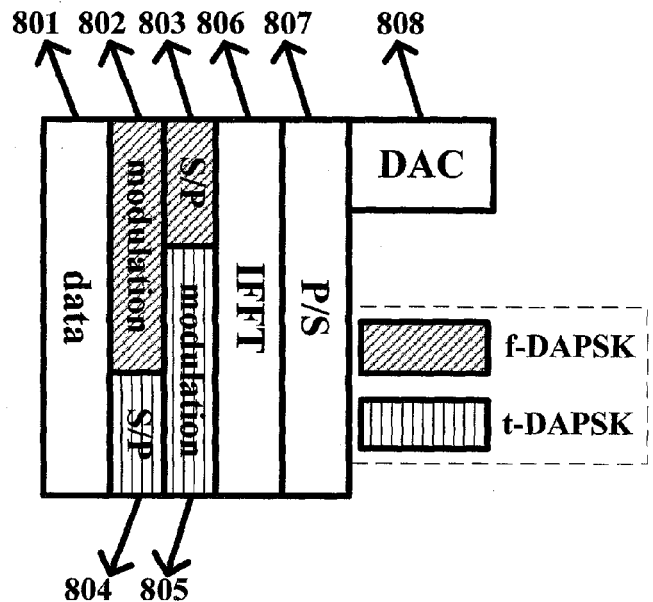
FIG. 7 shows a specific way of generating APSK signals according to an embodiment of the present invention with 16APSK signal as an example.
FIG. 8 is a schematic representation of generating DAPSK signals in frequency domain according to an embodiment of the present invention.

FIG. 7 is a schematic diagram of a specific way of generating APSK signals according to an embodiment of the present invention with 16APSK signals as an example. As shown in FIG. 7, corresponding to FIG. 6, 701 denotes 3 bits of information for phase modulation, wherein 8 combination modes correspond to 8 phases according to Gray encoding, that is, as labeled with 702, they represent phase information without performing differential encoding. 703 denotes 1 bit of information for amplitude modulation, wherein 2 modes correspond to 2 amplitudes, that is, as labeled with 704, they represent amplitude information without performing differential encoding.

FIG. 8 is a structural representation of generating DAPSK signals in case of multi-carrier signals according to the present invention. As shown in FIG. 8, 801 denotes bit stream data. 802 denotes performing DAPSK modulation, 803 denotes converting serial bit streams into parallel bit streams, which is the case for f-DAPSK signals, meanwhile, in the case for t-DAPSK signals, firstly, perform serial-parallel conversion as labeled with 804, and then perform DAPSK encoding. 806 denotes performing inverse Fourier transformation on mapped signals. 807 denotes converting parallel signals into serial signals. 808 denotes digital/analog conversion that converts digital signals into analog signals.

Figure 9:
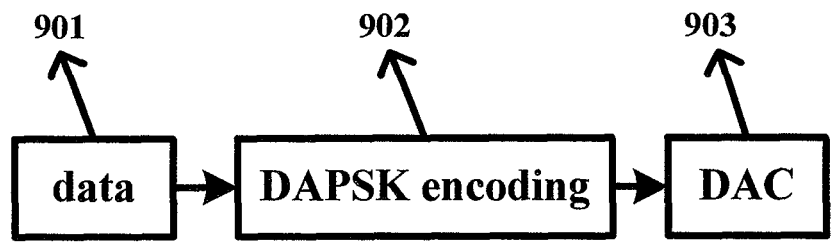
FIG. 9 is a schematic representation of generating DAPSK signals in time domain according to an embodiment of the present invention.

FIG. 9 is a schematic representation of generating DAPSK signals in case of single-carrier according to an embodiment of the present invention. As shown in FIG. 9, 901 denotes bit stream data. 902 denotes performing DAPSK differential encoding. 903 denotes digital/analog conversion that converts digital signals into analog signals.

Figure 10:
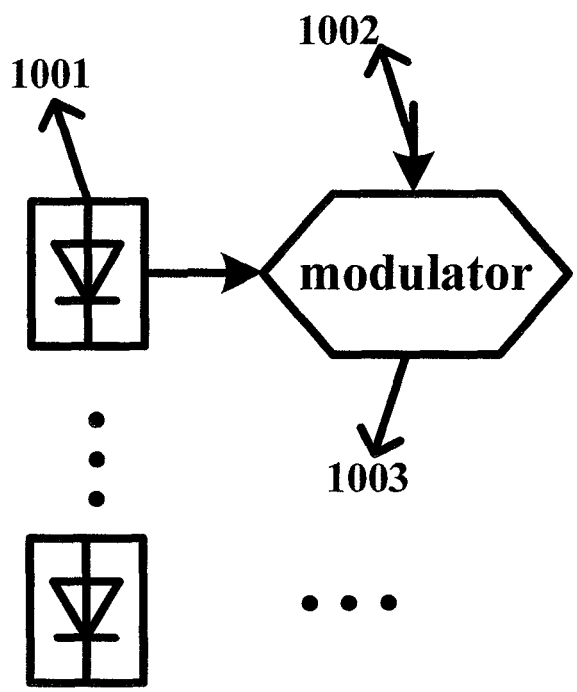
FIG. 10 is a schematic representation of generating optical DAPSK signals according to an embodiment of the present invention.

FIG. 10 is a schematic representation of generating optical DAPSK signals by direct mapping according to an embodiment of the present invention. As shown in FIG. 10, 1001 denotes a first laser source, 1002 denotes electrical signals, 1003 denotes a modulator (i.e. optical signal generating unit) for converting electrical signals into optical signals. Depending on the number of the required optical carriers, a plurality of laser sources or other devices may be required to replace the first laser source 1001 to generate optical carriers.

Figure 11:
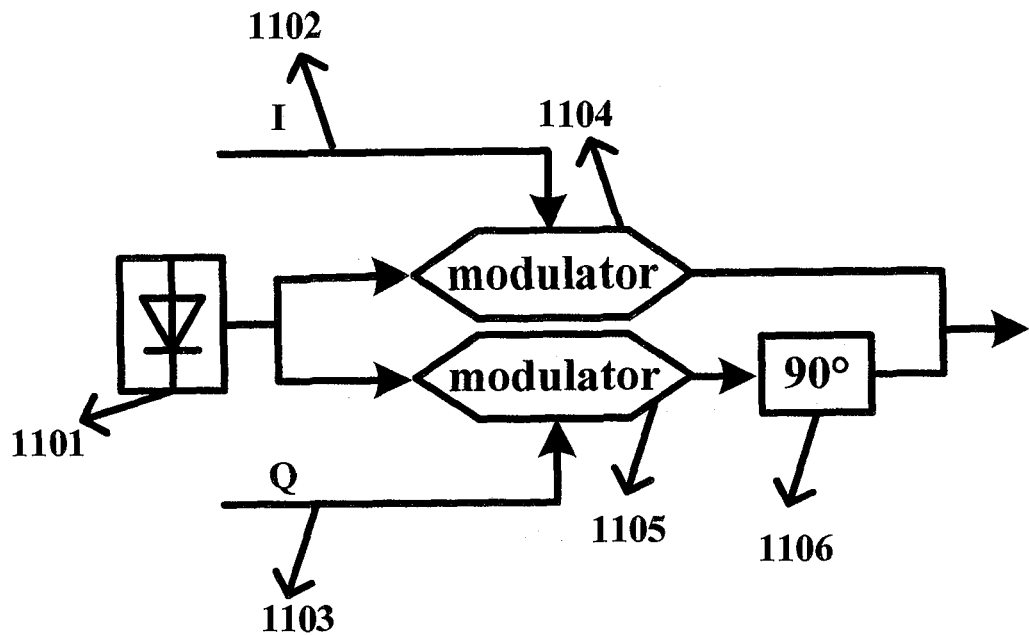
FIG. 11 is a schematic representation of generating optical DAPSK signals by coherent mapping according to an embodiment of the present invention.

FIG. 11 is a schematic representation of generating optical DAPSK signals by coherence mapping according to an embodiment of the present invention. As shown in FIG. 11, 1101 denotes a laser source, 1102 and 1103 denote the in-phase component and the orthogonal component of an electrical signal respectively. Modulators 1104 and 1105 convert signals from electrical domain into optical domain, and the orthogonal component further needs to pass a 90° light phase shifter 1106. Depending on the number of the required optical carriers, a plurality of laser sources or other devices may be required to replace the laser source 1101 to generate optical carriers.

Figure 12:
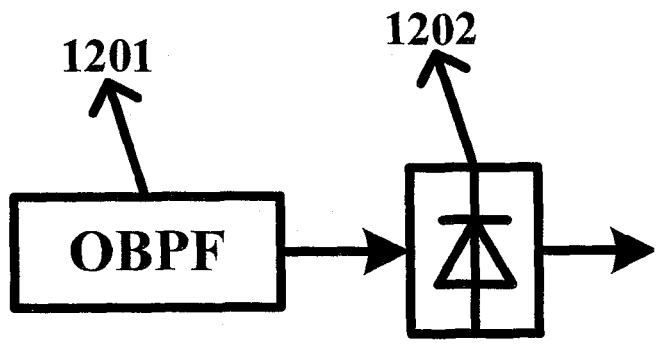
FIG. 12 is a schematic representation of performing direct detection on optical DAPSK signals according to an embodiment of the present invention.

FIG. 12 is a schematic representation of performing direct detection on the optical DAPSK signals according to an embodiment of the present invention. As shown in FIG. 12, 1201 is an optical band-pass filter for selecting the optical carrier carrying the required data signals, 1202 denotes a photodiode for converting optical signals into electrical signals.

Figure 13:
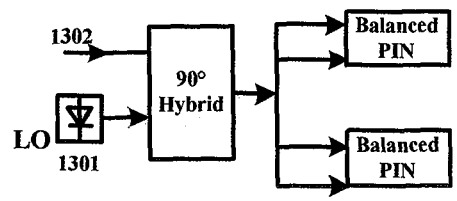
FIG. 13 is a schematic representation of performing coherent detection on optical DAPSK signals according to an embodiment of the present invention.

FIG. 13 is a schematic representation of performing coherent detection on the optical DAPSK signals according to an embodiment of the present invention. As shown in FIG. 13, 1301 denotes a local laser at the receiver. 1302 denotes the received signals. 1303 denotes a 90° light hybrid. 1306, 1307, 1308 and 1309 denote 4 photodiodes for balance receiving optical signals, and outputting the in-phase components I and the orthogonal components Q of the signals at the receiver, respectively.

The optical communication systems according to embodiments of the present invention have been described with reference to FIG. 1 to FIG. 13, and in the following, the operation procedures of the transmitter and the receiver in the optical communication system according to the present invention will be described with reference to FIG. 14 and FIG. 15, respectively.

Figure 14:
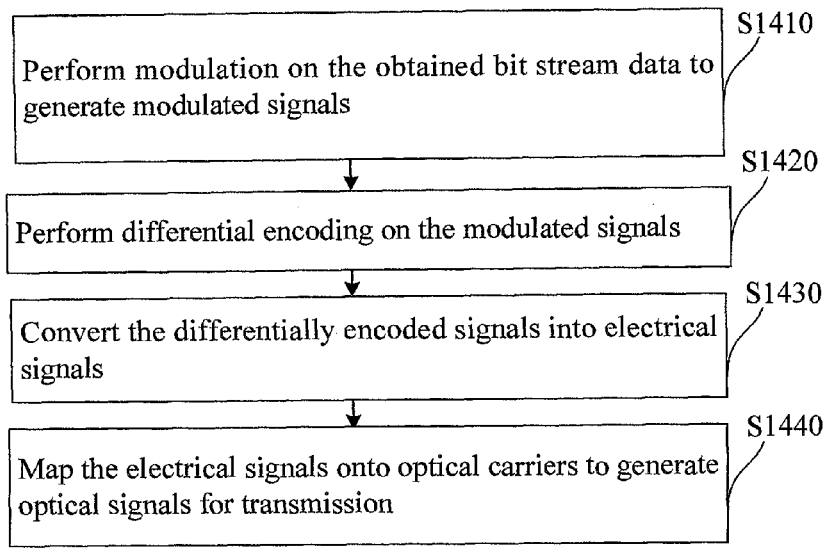
FIG. 14 is a flow chart showing the procedures executed by the transmitter according to an embodiment of the present invention.

FIG. 14 shows a flow chart of the operation procedures implemented at the transmitter in the optical communication system according to the present invention. As shown in FIG. 14, at the transmitter, first of all, in the step S1401, the obtained bit stream data are modulated to generate modulated signals; then, in the step S1402, the modulated signals are differentially encoded to generate differentially encoded signals; subsequently, in the step S1403, differentially encoded data are converted into electrical signals; and after that, in the step S1404, the electrical signals are mapped onto optical carriers to generate optical signals for transmission. The differential encoding is performed in different manners depending on whether the electrical signals are multi-carrier signals or single-carrier signals, the specific procedures have been described in the preceding part with respect to the corresponding parts in the transmitter, and will be repeated herein.

Figure 15:
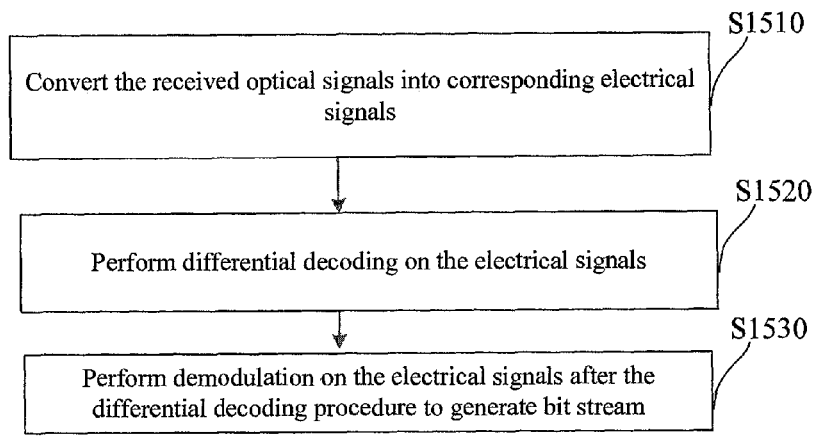
FIG. 15 is a flow chart showing the procedures executed by the receiver according to an embodiment of the present invention.

FIG. 15 shows a flow chart of the operation procedures performed at the receiver in the optical communication system according to the present invention. As shown in FIG. 15, at the receiver, first of all, in the step S1510, the received optical signals are converted into corresponding electrical signals; then, in the step S1520, the electrical signals obtained in the photoelectric conversion procedure are differentially decoded; subsequently, in the step S1530, the electrical signals after being processed in the differential decoding procedure are demodulated to generate the bit stream data. The differential encoding performed on the electrical signals has been described with respect to the receiver in the above description.

The communication methods and systems provided in the present invention may be not only applicable to baseband optical OFDM systems, but also to RF modulation optical OFDM systems; not only applicable to direct detection optical OFDM systems (DD-OFDM), but also to coherent optical OFDM systems (CO-OFDM); not only applicable to ultra long-haul optical OFDM systems, but also to other optical systems including OFDM-PON systems, which apply the OFDM technology. They are not only applicable to traditional OFDM systems, but also to all-optical OFDM systems. They are further applicable to WDM and Superchannel. Since this approach does not need known data such as training symbols, and pilot sub-carriers, there is no compensating algorithm consumptions. Due to the differential relationship introduced at the transmitter, the present invention can effectively suppress inter-carrier interference and improve system performance.

Specifically, as illustration, taking a coherent optical OFDM system with a transmitting rate of 40 Gb/s as an example, comparison is implemented as for the performances of OFDM systems with 16DAPSK modulation scheme and 16QAM modulation scheme, respectively. Wherein, the number of the sub-carriers used in the OFDM signals is 165, the IFFT size used in the IFFT procedure is 256, no pilot sub-carriers are added to any signals, one training symbol is added only for 16QAM case, the length of the cyclic prefix is 10. Assuming other conditions are ideal, for example, the extinction ratio of the modulator is 100 dB, the insert loss is 0, and the phase of the laser is 0, now only the laser linewidths at the transmitter and the receiver will be taken into consideration. At this time, when the bit error rate reaches $1.2\times10^{-3}$, the 16DAPSK scheme with differentiation relation in frequency domain can tolerate a linewidth of 110 kHz, the 16DAPSK scheme with differentiation relation in time domain can tolerate a linewidth of 45 kHz, while 16QAM scheme can only tolerate a linewidth of 22 kHz. Assuming that the laser linewidth is 40 kHz, then the Q value of a 16QAM encoded OFDM system decreases by 6 dBs compared with that of a 16DAPSK encoded system with frequency domain differentiation, and decreases by 4 dBs compared with that of a 16DAPSK encoded system with differentiation relation in time domain. Apparently, the DAPSK encoded system has a significantly improved capability of tolerating phase noise. In considering the nonlinearity situation, suppose that a transmission distance are 6 spans with each span of 80 km, the optical fiber parameter values are as follows: dispersion coefficient $D_{SSMF}$=17 ps/nm/km, attenuation $\alpha_{SSMF}$=0.2 dB/km, nonlinear coefficient $\gamma_{SSMF}$=1.3 $w^{-1}km^{-1}$, the Er-doped fiber amplifiers (EDFA) for the spans are configured to completely compensate for the fiber loss, with the noise index thereof being 6 dB. Neglecting influences of other factors, it may be obtained that: the optimal launch power for a 16QAM encoded OFDM system is −10 dBm, the corresponding Q value is 9.7 dB, while the optimal launch power for a 16DAPSK encoded OFDM system with time domain differentiation is −8 dBm, the corresponding Q value is 12.2 dB; the optimal launch power for a 16DAPSK encoded OFDM system with frequency domain differentiation is −8 dBm, the corresponding Q value is 11.7 dB. Apparently, the DAPSK encoded systems' tolerance towards nonlinearity is also improved.

Furthermore, in order to clearly illustrate the advantages of the optical communication systems according to the present invention over other optical communication systems without applying differential encoding technique, hereinafter, examples such as q-OFDM, t-OFDM and f-OFDM will be described, wherein, q-OFDM, t-OFDM and f-OFDM denote 16QAM encoded OFDM system, 16DAPSK encoded OFDM system with differentiation relation in time domain, and 16DAPSK encoded OFDM system with differentiation relation in frequency domain, respectively. As shown, they are slightly different in generating OFDM signals. For sake of brevity, effects caused by D/A and A/D are neglected in simulations, that is, it is assumed that the analog-to-digital conversion and the digital-to-analog conversion are ideal.

The baseband OFDM signal is generated with a MATLAB program by sequentially performing mapping, serial-to-parallel conversion, training symbol addition, inverse Fourier transformation, cyclic prefix addition and parallel-to-serial conversion on a $2^{15}-1$ pseudorandom binary sequence (PRBS). Wherein, 16QAM, 16DAPSK with time domain differentiation, and 16DAPSK with frequency domain differentiation are used for symbol mapping; the FFT size is 256, wherein 165 sub-carriers are useful, remaining 91 zero visual sub-carriers are located in the middle of the spectrum. For 16DAPSK encoded OFDM systems, no training symbols or pilot sub-carriers are used, while for 16QAM encoded OFDM system, pilot sub-carriers and training symbols are needed for channel estimation and balance; the cyclic prefix have a length of 10.

The time duration of one OFDM symbol is 26.6 ns, therefore the guard interval is 1.0 ns and the nominal bit rate (for all data, including the training symbols and effective data) thereof is 40 Gb/s, occupying a bandwidth of less than 6.7 GHz. The baseband OFDM signal is processed by a raised cosine filter in order to remove aliasing products and then transformed to optical domain using an I/Q modulator (usually, using dual-parallel modulator). The transmission link includes a power controlled EDFA and a recirculating loop. The loop has an 80 km standard single mode fiber (SSMF) and a gain controlled EDFA. The fiber parameters are: dispersion coefficient $D_{SSMF}$=17 ps/nm/km, attenuation $\alpha_{SSMF}$=0.2 dB/km, nonlinear coefficient $\gamma_{SSMF}$=1.3 w$^{-1}$km$^{-1}$. And the gain controlled EDFA with a noise figure of 6 dB is used to compensate for the SMF attenuation. At the receiver, a 2nd order Gaussian-shaped optical band-pass filter with a bandwidth of 20 GHz is used to filter out ASE noises. The coherent receiver consists of a local oscillator (LO), a 90° hybrid, and two balanced detectors. Then the electrical signal filtered is processed with a MATLAB program. In the signal processing part, except that an operation inverse to that at the transmitter is performed, for q-OFDM, channel transfer function is estimated through training symbols that are placed at the beginning, while phase offset is compensated for through pilot sub-carriers that are inserted periodically; and for t-OFDM and f-OFDM, only demodulation is needed. In each simulation, about 500 OFDM symbols are evaluated for bit-error-ratio (BER) with a Monte Carlo method, Q value (Q$^2$ factor), derived from the BER, is calculated by the following formula:

$$Q^2 \text{ Factor (dB)} = 20 \times \log_{10}(\sqrt{2} \times \text{erfcinv}(2 \times \text{BER}))$$

It should be noted that, during a simulation, the first symbol is discarded at the transmitter due to the differential modulation for t-OFDM and f-OFDM. To be fairly compared, for q-OFDM, one training symbol and no pilot sub-carrier is used, and the resultant spectral efficiency and useful data rate are close to those with t-OFDM and f-OFDM. Furthermore, various amounts of training symbols and pilot sub-carriers are applied to q-OFDM in order to obtain similar performance with t-OFDM and f-OFDM, which will decrease the spectrum efficiency and effective bit rate. As shown in FIG. 20, FIG. 21 and FIG. 22, the numbers in brackets represent the interval of pilot sub-carriers and training overhead (which is defined as the number of the training symbols/the number of the useful data symbols) in order. Unless otherwise indicated, one training symbol and no pilot sub-carrier is used for q-OFDM mentioned in simulation.

Figure 16:
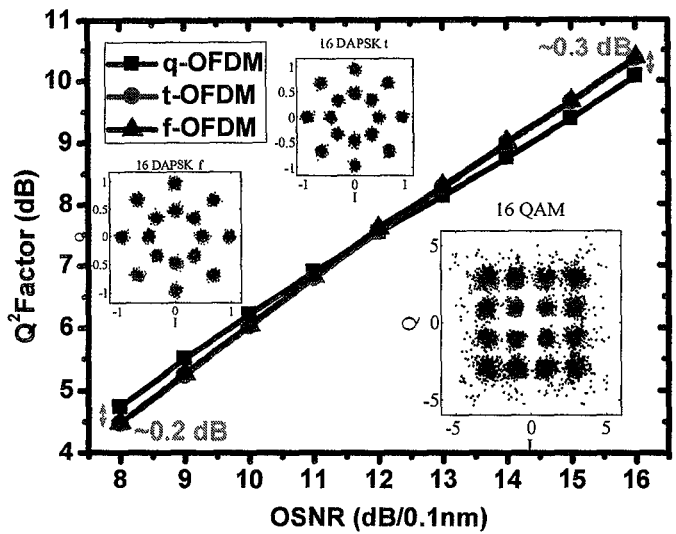
FIG. 16 shows Q value versus receiver OSNR in back-to-back case.

FIG. 16 depicts Q value versus receiver OSNR in back-to-back case. In FIG. 16, the insets are three constellations at the corresponding receiver in a case of OSNR=15 dB, the three constellations have similar performances, BER thereof approximately equal to 1.2×10$^{-3}$. As a result, t-OFDM, f-OFDM and q-OFDM have the similar OSNR requirement towards ASE noise.

Figure 17:
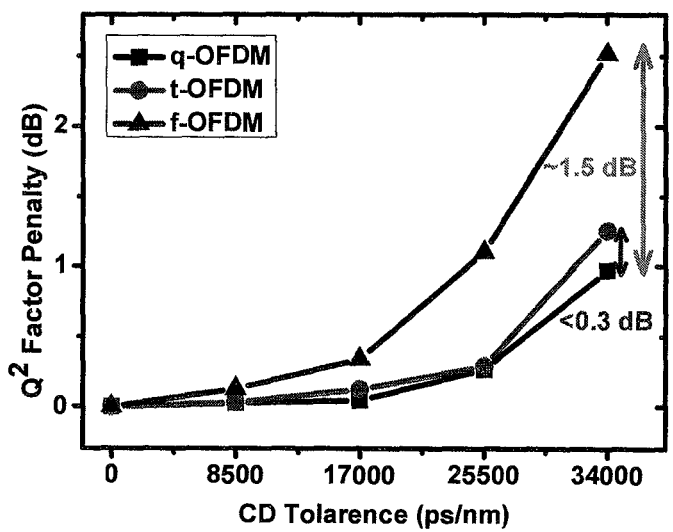
FIG. 17 shows Q value penalty versus accumulated chromatic dispersion.
Figure 19A:
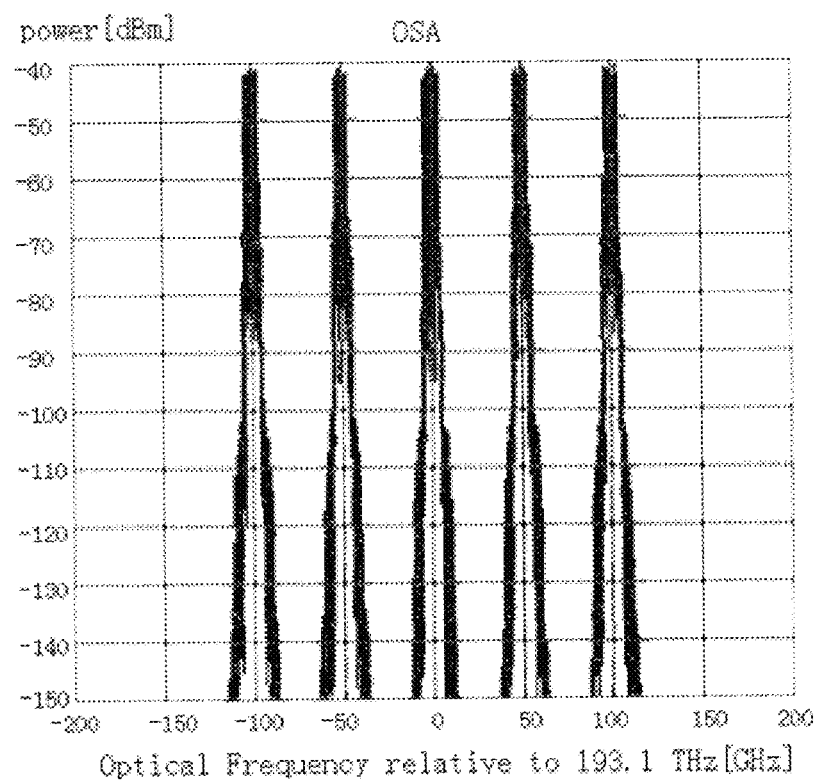
FIGS. 19(a) and 19(b) shows optical spectrums of a WDM system before and after 480 km of transmission.
Figure 19B:
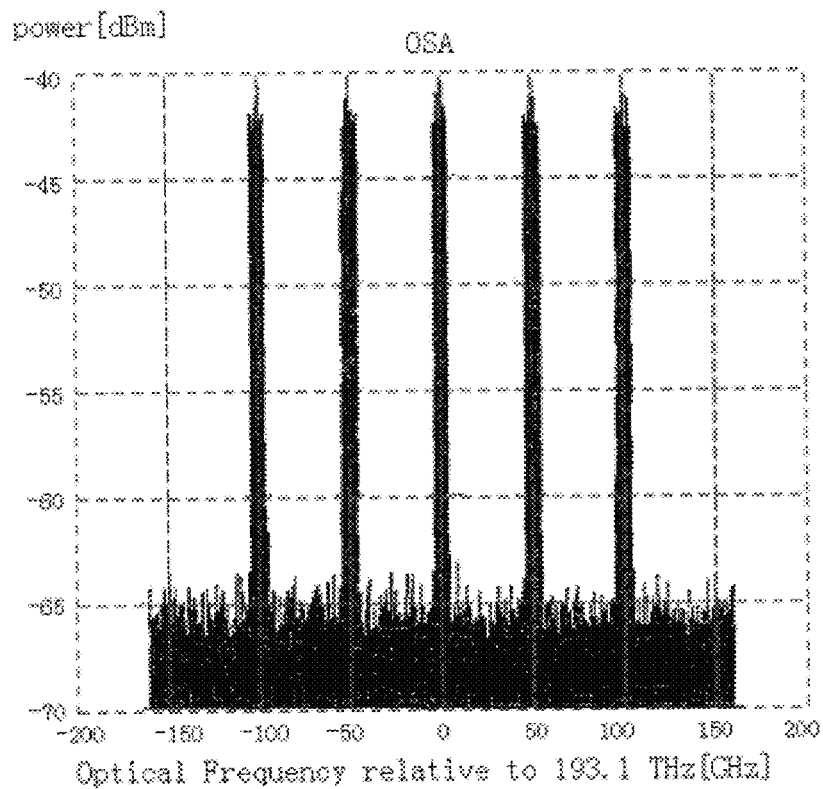

FIG. 17 shows Q value penalty versus accumulated chromatic dispersion (CD) at an OSNR of 15 dB/0.1 nm. The tolerance of these three kinds of OFDM systems to accumulated CD is evaluated by transmitting optical OFDM signals through a fiber with only CD effect. FIG. 19 is a graph of Q value penalty under different accumulated CDs in a case of OSNR=15 dB.0.1 nm. Q value penalty is defined as the difference from a Q value when there is no CD effect. It can be seen that, after 2000 km of virtual fiber transmission and at a CD value of 34000 ps/nm, the Q value penalty of f-OFDM is about 1.5 dB larger than that of q-OFDM, while Q penalty difference between t-OFDM and q-OFDM is less than 0.3 dB. The reason is that, for f-OFDM the differential modulation among adjacent sub-carriers makes it more sensitive to the phase differences induced by accumulated CD, especially to the large phase variation in the presence of a large CD. The minor advantage of q-OFDM over t-OFDM is mainly due to the large constellation spacing of 16QAM.

Figure 18A:
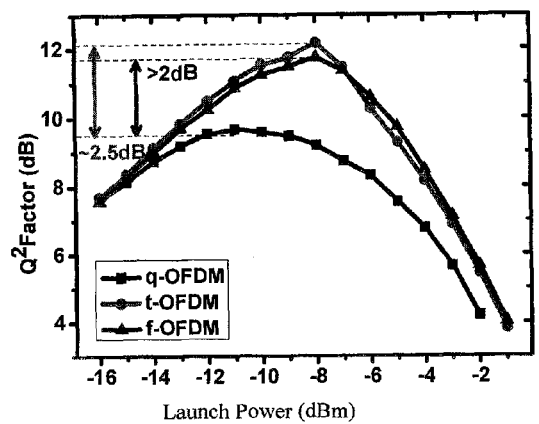
FIGS. 18(a) and 18(b) shows Q value versus launch power after 480 km of transmission.
Figure 18B:
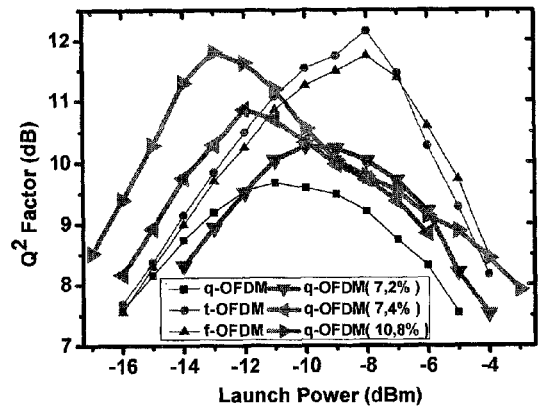

FIG. 18 shows Q value versus launch power after 480 km transmission in a single channel case, wherein, in FIG. 18(a), only one training symbol and no pilot sub-carrier is used for q-OFDM, while in FIG. 18(b), both training symbols and pilot sub-carriers are used for q-OFDM.

FIG. 18 depicts the tolerance of the three systems for intra-channel nonlinearity within a channel. As shown in FIG. 18(a), both t-OFDM and f-OFDM outperform q-OFDM over the launch power range from −16 dBm to −1 dBm. Wherein, the optimal launch power is −10 dBm for q-OFDM and the corresponding Q value is 9.7 dB; the optimal launch power of −8 dBm is the same for t-OFDM and f-OFDM, while the corresponding Q values are 11.7 dB and 12.2 dB, respectively, indicating at least 2 dB improvement of Q value over q-OFDM. Even pilot sub-carriers and training symbols are used for q-OFDM, as shown in FIG. 18(b), the improvement is limited, especially when the launch power is high and the nonlinear effect dominates. Furthermore, spectrum bandwidth is increased by about 6.6%~9.4% and bit rate is reduced by 1.9%~5.6% for q-OFDM.

FIG. 19 shows the nonlinear effect in a WDM system. FIG. 19 shows optical spectrums of 5-channel 50-GHz spaced WDM system over 480 km of SSMF spans before (left) and after (right) transmission. In a WDM system, the cross-phase modulation (XPM), as a major damage, degrades system performance greatly, therefore, tolerances of the three systems towards inter-channel nonlinearity are investigated in the following simulation.

Figure 20A:
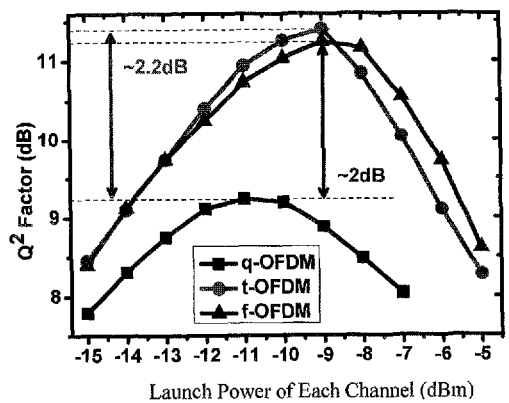
FIGS. 20(a) and 20(b) shows Q value versus launch power after 480 km of transmission.
Figure 20B:
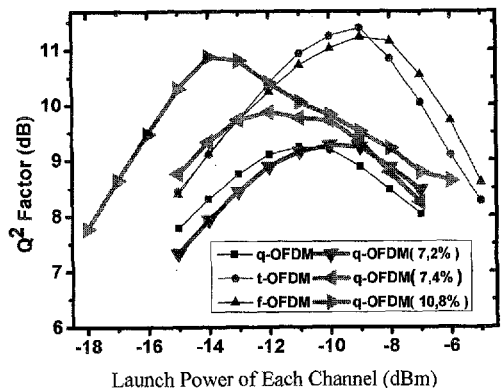

Simulation results of the OFDM signal of the center channel are shown in FIG. 20. In FIG. 20(a), only one training symbol and no pilot subcarrier is used for q-OFDM, and at this time, the optimal signal launch power per wavelength channel for t-OFDM, f-OFDM and q-OFDM are −9 dBm, −9 dBm and −11 dBm while the corresponding Q values are 11.4 dB, 11.2 dB and 9.2 dB, respectively, indicating that t-OFDM and f-OFDM has at least 2 dB improvement over q-OFDM. In FIG. 20(b), insertion of training symbols and pilot sub-carriers can properly improve the performances of the system, however, it has similar phenomena as that with single carrier. That is, improvement of performance is limited when the nonlinear effect is dominant, meanwhile spectrum bandwidth is increased by about 6.6%~9.4% and bit rate is reduced by 1.9%~5.6%.

Regarding f-OFDM, the differential modulation is performed among adjacent sub-carriers. As a result, f-OFDM is more sensitive to the phase differences induced by accumulated CD. But the differential relation provides a function like a pilot sub-carrier to supply f-OFDM with the strongest robustness towards nonlinear effect. Regarding t-OFDM, the differential relationship is between adjacent symbols, which reduces the influence of CD effect. Therefore, both amplitude differentiation and phase differentiation performed in either frequency domain or time domain have greatly increased the nonlinearity tolerance of OFDM signal not only in single channel but also in WDM environment. For q-OFDM, since there is no correlation between sub-carriers or symbols, it needs apriori knowledge, e.g., pilot sub-carriers and training symbols, to obtain channel matrix. With algorithms used herein, linear impairments could be compensated well, but the performance improvement against nonlinear influence is limited. Besides, pilot sub-carriers would occupy extra spectrum and the insertion of training symbols would lead to the decrease of bit rate. Thus, it can been seen that the 16DAPSK encoded optical OFDM are more robust towards transmission impairments such as ASE noise, chromatic dispersion and fiber nonlinearity while enjoying no requirement of apriori knowledge and thus less receiver complexity.

The differential encoding based optical communication systems provided in the present invention may be directly applied to various optical transmission systems to simplify the systems and reduce the costs while ensuring spectrum efficiency.

It can be seen from the description of the above embodiments, the differential encoding based optical communication method and system provided in the present invention has the following advantages:

1) It can avoid inserting known data such as training symbols and pilot sub-carriers for the compensating algorithm such as channel estimation, and can directly perform demodulation and judgment at the receiver, which greatly enhances the useful data rate, spectrum efficiency and the cost of systems.

2) It can enhance signals' tolerance towards laser linewidth, fast-varying PMD, optical fiber nonlinearity, inter-channel interference and other damages and improve system performances.

3) Various elements employed in the present application are all common elements, hence a low cost and strong practicability are ensured.

4) The multi-carrier optical communication systems described in the present invention is suitable for use in various optical communication systems.

As above, a differential encoding based optical communication method and system according to the present invention are described by way of illustration with reference to drawings. However, those of skills in the art should appreciate that for the above-mentioned differential encoding based optical communication method and system proposed in the present invention, various improvements can be made without departing from the contents of the present invention. Therefore, the protection scope of the present invention should be defined by the contents of the appended claims.

What is claimed is:

1. An optical communication method, comprising:
performing modulation on the obtained bit stream data, so as to generate modulated signals;
performing differential encoding on the modulated signals, so as to generate differentially encoded signals;
converting the differentially encoded signals into electrical signals; and
mapping the electrical signals onto optical carriers, so as to generate optical signals for transmission,
wherein, the electrical signals are multi-carrier signals, the step of performing differential encoding on the modulated signals so as to generate the differentially encoded signals comprises:
performing differential encoding on the same sub-carrier of adjacent symbols in the modulated signals if the differential encoding is performed in time domain; or
performing differential encoding on the adjacent sub-carriers of the same symbol in the modulated signals if the differential encoding is performed in frequency domain, and
if the differential encoding is performed in time domain, the method further comprises:
performing serial-to-parallel conversion on the modulated signals so as to convert the modulated signals into parallel signals before the differential encoding is performed; and
performing inverse Fourier transformation, cyclic prefix addition and parallel-to-serial conversion on the differentially encoded signals so as to generate differentially encoded OFDM data signals after the differential encoding is performed.

2. The optical communication method of claim 1, wherein, the bit stream data are modulated by using an amplitude phase shift keying (APSK) technique.

3. The optical communication method of claim 1, wherein, the bit stream data are modulated by using an amplitude phase shift keying (APSK) technique.

4. The optical communication method of claim 1, wherein, the bit stream data are modulated by using an amplitude phase shift keying (APSK) technique.

5. An optical communication method, comprising:
performing modulation on the obtained bit stream data, so as to generate modulated signals;
performing differential encoding on the modulated signals, so as to generate differentially encoded signals;
converting the differentially encoded signals into electrical signals; and
mapping the electrical signals onto optical carriers, so as to generate optical signals for transmission,
wherein, the electrical signals are multi-carrier signals, the step of performing differential encoding on the modulated signals so as to generate the differentially encoded signals comprises:
performing differential encoding on the same sub-carrier of adjacent symbols in the modulated signals if the differential encoding is performed in time domain; or
performing differential encoding on the adjacent sub-carriers of the same symbol in the modulated signals if the differential encoding is performed in frequency domain, and
if the differential encoding is performed in frequency domain, the method further comprises:
performing serial-to-parallel conversion, inverse Fourier transformation, cyclic prefix addition and parallel-to-serial conversion on the differentially encoded signals so as to generate differentially encoded OFDM data signals after the differential encoding is performed.

6. A transmitter, comprising:
a modulation unit, configured to perform modulation on the obtained bit stream data so as to generate modulated signals;
a differential encoding unit, configured to perform differential encoding on the modulated signals, so as to generate differentially encoded signals;
a conversion unit, configured to convert the differentially encoded signals into electrical signals;
a mapping unit, configured to map the electrical signals onto optical carriers, so as to generate optical signals;
a transmitting unit, configured to transmit the generated optical signals;
a first serial-to-parallel conversion module, configured to perform serial-to-parallel conversion on the modulated signals to generate parallel signals when the electrical signals are multi-carrier signals and the differential encoding is performed in time domain; or configured to perform serial-to-parallel conversion on the differential encoded signals to generate parallel signals when the electrical signals are multi-carrier signals and the differential encoding is performed in frequency domain;
an Inverse Fast Fourier Transformation (IFFT) module, configured to perform inverse Fourier transformation on the differentially encoded signals outputted from the differential encoding unit or the parallel signals outputted from the serial-to-parallel conversion module; a cyclic prefix addition module, configured to add cyclic prefixes to the signals that have been subjected to the inverse Fourier transformation procedure; and
a first parallel-to-serial conversion module, configured to perform parallel-to-serial conversion on the signals that have been subjected to the cyclic prefix addition procedure to generate differentially encoded OFDM signals, wherein, the electrical signals are multi-carrier signals,
the differential encoding unit performs differential encoding on the same sub-carrier of adjacent symbols in the modulated signals if the differential encoding is performed in time domain; or
the differential encoding unit performs differential encoding on adjacent sub-carriers of the same symbol in the modulated signals if the differential encoding is performed in frequency domain.

7. The transmitter of claim 6, wherein, the mapping unit comprises:
   a first laser source, configured to generate optical carriers; and
   an optical signal generating unit, configured to modulate the differentially encoded signals onto the optical carriers, so as to be converted to optical signals.

8. A receiver, comprising:
   a receiving unit, configured to receive the optical signals transmitted from a transmitter;
   a photoelectric conversion unit, configured to convert the received optical signals into corresponding electrical signals;
   a differential decoding unit, configured to perform differential decoding on the electrical signals outputted from the photoelectric conversion unit;
   a demodulation unit, configured to perform demodulation on the electrical signals outputted from the differential decoding unit, so as to generate bit stream data;
   a second serial-to-parallel conversion module, configured to convert the electrical signals from serial signals to parallel signals;
   a cyclic prefix removal module, configured to remove the cyclic prefixes from the parallel signals;
   a Fast Fourier Transformation (FFT) module, configured to perform Fourier transformation on the signals outputted from the cyclic prefix removal module; and
   a second parallel-to-serial conversion module, configured to convert the parallel signals outputted from the FFT module into serial signals for being further processed by the differential decoding unit, or configured to convert the parallel signals, obtained after the signals outputted from the FFT module are processed by the differential decoding unit, into serial signals.

9. An optical communication system, comprising:
the transmitter according to claim 6.

10. An optical communication system, comprising:
the receiver according to claim 8.

* * * * *